July 10, 1962 L. SINKEWITSCH 3,043,531

DECK FOR TAPE RECORDING

Filed April 11, 1960

INVENTOR:
LEONID SINKEWITSCH

BY Michael S. Striker
ATTORNEY 3,043,531

DECK FOR TAPE RECORDING

Leonid Sinkewitsch, Nurnberg, Germany, assignor to Max Grundig, Furth, Bavaria, Germany Filed Apr. 11, 1960, Ser. No. 21,228
Claims priority, application Germany May 12, 1959
12 Claims. (Cl. 242—55.13)

The present invention relates to improvements in the construction of decks for tape recorders, and more particularly to improvements in the construction of deck-mounted tape guiding members and tape heads for tape recorders of the type utilizing a cartridge which contains the tape reels and is removably mounted on the tape deck.

It is already known to mount a two-reel cartridge in a frame which is pivotably supported on the tape deck and to guide that portion of the finite tape which extends between the reels along one or more deck-mounted tape heads and along one or more deck-mounted tape guiding members which insure that the tape is properly advanced from the supply reel to the takeup reel and vice versa. A serious disadvantage common to all recorders of this general character is that the tape is frequently caught by the guiding members or by the tape heads whenever the cartridge is pivoted between its operative and inoperative positions. Therefore, the insertion or removal of the cartridge requires much attention because careless handling could result in undue tensioning, tearing or other damage to the tape and would prevent the transporting system from properly advancing the tape when the recorder is in actual use.

An important object of the present invention is to provide a tape guiding and deflecting member for use in recorders of the above outlined type which is constructed, mounted and operated in such a way that it cannot impede movements of the tape when the cartridge is pivoted or otherwise moved between its operative and inoperative positions.

Another object of the invention is to provide a tape guiding and deflecting member of the just outlined characteristics which may be readily installed on the decks of all such presently known tape recorders which utilize a removable tape-containing cartridge.

A further object of the invention is to provide a tape guiding member which is constructed and mounted in such a way that its operation need not require a separate step as the guiding member may be moved into tape guiding and releasing positions by control means which simultaneously performs one or more additional functions in the tape recorder.

A concomitant object of the instant invention is to provide a tape guiding and deflecting member of the above outlined characteristics which simultaneously performs at least one additional function, for example, by contributing to proper retention of the cartridge in operative position.

Still another object of the invention is to provide a tape head which is of such configuration that it does not interfere with movements of the tape when the cartridge is placed onto and removed from the deck of a tape recorder.

With the above objects in view, the invention resides in the provision of a substantially bolt-shaped tape guiding and deflecting member which is rotatably mounted on the tape deck and is adapted to project through suitable apertures in the tape-containing cartridge which latter is preferably insertable into and removable from a frame pivoted to the tape deck. The guiding member comprises a supporting portion which is combined with means for rotating the same, e.g. a rack and pinion drive which may be actuated by a pushbutton like control element, and a flattened tape guiding portion which is eccentrically mounted on the supporting portion and is turnable by the latter into a first angular position in which one of its components engages the adjacent tape portion, and into a second angular position in which said component moves away from and turns a substantially flat surface portion toward the tape. The tape guiding component mounts a substantially semiconical or half-mushroom shaped retaining component which, together with the supporting portion, forms a recess or groove to prevent lateral movements of the tape in its own plane and in directions transverse to its longitudinal direction. A flat surface portion of the tape retaining component is preferably at least slightly inclined with respect to and constitutes a continuation of the flat surface portion of the tape guiding component so as to further reduce the likelihood that the flattened portion of the guiding member would engage with the tape during pivotal movements of the cartridge between its operative and inoperative positions.

The control element which initiates the turning of the tape guiding member through substantially 180 degrees between its operative and tape-releasing angular positions preferably performs at least one additional function; for example, it may be utilized for triggering pivotal movements of the cartridge with respect to the tape deck or it may control one of the motors which form part of the tape recorder.

Each tape head preferably comprises a tape-engaging face a portion of which is at least slightly inclined in a direction away from the adjacent side of the tape whereby, when the cartridge is pivoted into operative position, the tape first travels along the inclined face portion before moving into requisite position with respect to the gap of the tape head.

The tape recorder may comprise one, two or more tape guiding members and tape heads which preferably alternate with each other and are disposed at the opposing sides of that tape portion which extends between the reels of the pivotable cartridge.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figures 2, 3:
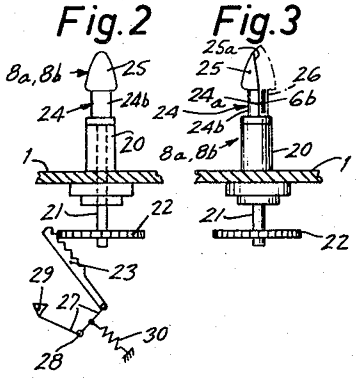
FIG. 2 is a schematic side elevational view of a tape guiding member and of the means for rotating the same, the tape guiding member being shown from that side which is adapted to guide and to deflect the tape when the recorder is in actual use.
Figure 4:
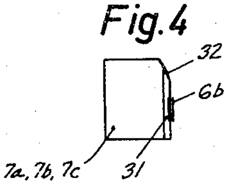

FIG. 3 illustrates the tape guiding member of FIG. 2 turned through 90 degrees to reveal the tape receiving space defined by the flattened tape guiding portion of the guiding member to facilitate insertion and removal of the cartridge; and FIG. 4 is a schematic side elevational view of a tape head whose tape engaging face is shaped in a novel way to facilitate unimpeded movements of the cartridge into and from its operative position.

Figure 1:
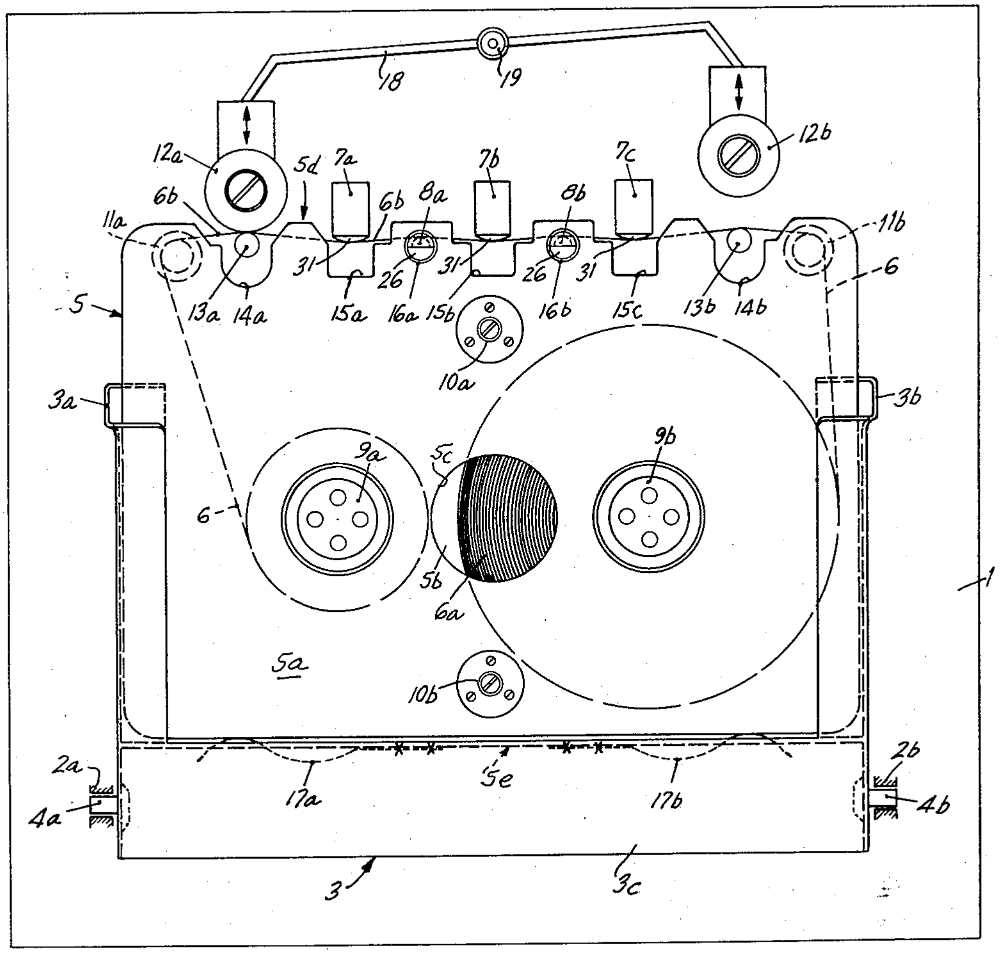
FIG. 1 is a schematic top plan view of a tape deck mounting three tape heads, two tape guiding members, and a pivotable two-reel cartridge, all constructed in accordance with my invention.

Referring now in greater detail to the drawings, and first to FIG. 1, there is shown a tape deck 1 whose exposed outer side mounts two spaced coaxial bearings 2*a*, 2*b* for the outwardly extending pivot axles 4*a*, 4*b*, respectively, of a swingable U-shaped receptacle or frame 3. The frame may be pivoted, either by hand or by suitable actuating means, about the common axis of parts 2*a*, 2*b* and 4a, 4b between the illustrated position of substantial parallelism with the exposed side of the deck 1, and a second position in which its channel-shaped extensions or arms 3a, 3b are swung away from the deck 1 to permit convenient and unimpeded insertion or withdrawal of a flat, substantially rectangular two-reel cartridge or magazine 5, whereupon the frame is returned into the position of FIG. 1 to introduce a magnetic tape 6 between the spaced tape heads 7a, 7b, 7c and the bolt-shaped tape guiding and deflecting members 8a, 8b in such manner that the tape heads 7a–7c are located at the outer side of the tape and that the bolts 8a, 8b which alternate with the tape heads are located at the opposed or inner side of the tape. It is normally sufficient to pivot the frame 3 through an angle of about 15 degrees in order to permit ready insertion or withdrawal of the cartridge.

The cartridge 5 comprises two shells 5a, 5b at least one of which is preferably formed with a cutout 5c to permit observation of the convolutions 6a formed between shells 5a, 5b on the flangeless reels 9a, 9b. The two shells are held together by suitable male and female bolt assemblies 10a, 10b whose exact construction forms no part of my present invention. This also applies to the connection between the reels 9a, 9b and the driving motor or motors therefor. As is known, each reel may be coupled to a separate motor, or both reels may be driven by a single motor, or they may be driven by the capstan motor. The arrangement is preferably such that a coupling connection between the motor or motors and the reels 9a, 9b is automatically established and terminated, respectively, when the frame 3 is swung between its afore-described extreme positions.

The inner side of the tape 6, which may be payed out by the reel 9b to be taken up by the reel 9a, or vice versa, travels about a pair of deflecting rolls 11a, 11b mounted between the shells 5a, 5b adjacent to longitudinal ends of the at least partially open front side 5d of the cartridge. The outer side of the tape portion 6b which extends between the deflecting rolls 11a, 11b must pass along a first pressure roller or pinch wheel 12a, along the faces 31 of tape heads 7a, 7b, 7c, and along the second pinch wheel 12b. The inner side of the tape portion 6b passes along a first capstan spindle 13a, along the guiding members 8a, 8b, and along a second capstan spindle 13b. The guiding members 8a, 8b, the tape heads 7a, 7b, 7c, the capstan spindles 13a, 13b, and the pinch wheels 12a, 12b are mounted on the tape deck 1. In order to prevent any damage to the capstan spindles and to the tape heads during insertion or withdrawal of the cartridge 5, the latter's shells 5a, 5b are formed with aligned recesses 14a, 14b and 15a, 15b, 15c, respectively, which extend rearwardly from the front side 5d. The guiding members 8a, 8b extend through aligned apertures 16a, 16b, respectively, which are formed in the shells 5a, 5b and are freely rotatable in said apertures.

The rear side 5e of the cartridge is constantly biased by a pair of leaf springs 17a, 17b which are fixed to the base 3c of the swingable frame 3 and which prevent wobbling of the cartridge when the latter is in the operative position of FIG. 1. In addition, these springs may prevent unintentional pivoting of the frame about its pivot axles 4a, 4b by causing the shell 5b to engage with the bolts 8a, 8b and, furthermore, may be utilized to partially eject the cartridge when the frame is pivoted to move its arms 3a, 3b away from the tape deck 1. Of course, the tape deck may mount separate retaining means which releasably holds the cartridge or the frame in operative position. In accordance with a preferred construction, the movements of frame 3 into each of its extreme positions may be brought about by remote control, for example, by actuating a control element such as a pushbutton 29 (see FIG. 2) which is mounted on the tape deck 1 and which preferably performs at least one additional controlling function, e.g. to turn the guiding members 8a, 8b through about 180 degrees with respect to the position of FIG. 1.

The pinch wheels 12a, 12b are mounted at the ends of a two-armed lever 18 which is pivotable about a shaft 19 journaled in the tape deck 1. The shaft 19 is rockable by preferably pushbutton-shaped control means (not shown) in such a way that the operation of one component of the control means which may simultaneously start the motor of the capstan spindle 13a automatically swings the lever 18 in anticlockwise direction whereby the pinch wheel 12a presses the tape 6 against the member 13a so that the tape spills toward and is taken up by the winding reel 9a. The depression of a second component of the control means may start the motor of the capstan spindle 13b and simultaneosuly causes a movement of the right-hand pinch wheel 12b toward the member 13b so that the tape is taken up by the right-hand reel 9b. Of course, the rotary movements of reels 9a, 9b are controlled in such a way that the tape is subjected to requisite tension. The synchronization of rotary movements which the capstan spindle 13a or 13b and the reels 9a, 9b must perform is well known in the art of tape recorders.

In the embodiment of FIG. 1, the tape recorder comprises three tape heads, namely, the record head 7a, the erasing head 7b, and the playback head 7c. The three-head design is preferred because it simplifies the electric system of the tape recorder in that it eliminates the switching network required to change the function of one tape head from record to playback and again to record if the recorder is of the two-head type. All presently known recorders preferably utilize two or more tape heads because a single head, if required to perform all three functions, would be too clumsy and would entail much switching and extra tape handling. However, and as will be readily understood by reading the following part of this description, the improved construction of the tape head is applicable in all types of recorders which utilize a cartridge and a pivotable frame therefor, as well as in many other types of tape recorders.

FIG. 1 shows the bolt-shaped guiding members 8a, 8b in operative position in which they not only guide but also slightly deflect the tape portion 6b between the tape heads 7a, 7b and 7b, 7c, respectively. As is shown in FIGS. 2 and 3, each of these guiding members comprises a boss-shaped, preferably cylindrical supporting portion 20 which includes a downwardly extending coaxial shaft 21. The latter is rotatably mounted in and extends through the tape deck 1 and mounts a pinion 22 which is rotatable by a toothed rack 23. The supporting portion 20 carries the actual tape guiding and deflecting portion of the member 8a or 8b; this guiding portion comprises a flattened substantially semicylindrical tape guiding component 24 and a flattened substantially semiconical tape retaining component 25. The components 24, 25 are eccentric with respect to and are mounted on the supporting portion 20, and the length of the guiding component 24 exceeds only slightly the width of the tape 6 so that the tape portion 6b is properly guided in the groove or recess formed between the supporting portion 20 and the retaining component 25 when the guiding members 8a, 8b assume the positions shown in FIG. 1, i.e. when the arcuate peripheral surface portion 24b of the component 24 engages with the inner side of the tape. By turning the guiding members 8a, 8b through substantially 180 degrees with respect to the position of FIG. 1, the tape portion 6b passes through the spaces 26 (bounded by phantom lines in FIG. 3) which are adjacent to the flat surface portions 24a of components 24, i.e. into the spaces would would be occupied by imaginary mirror reflections of the components 24 and 25. In other words, when the guiding members 8a and 8b are in the operative position of FIG. 1, the adjacent inner side of the tape portion 6b engages with the arcuate surface portions 24b of guiding components 24 and, when the guide members are turned through about 180 degrees, the tape portion *6b* is preferably slightly spaced from and is substantially parallel with the flat surface portions *24a* of the guiding components 24.

The rack 23 is articulately connected to a two-armed lever 27 which is pivoted to the tape deck 1, as at 28, and which may be rocked by a control element 29, preferably a pushbutton or the like, mounted on the deck 1. A resilient element 30 constantly biases the rotating means 22, 23, 27, 29 into a position in which the rack 23 maintains the respective guiding member in the operative position of FIG. 1. The control element preferably performs one or more additional functions. As stated hereinabove, it may trigger automatic movement of the frame 3 into inclined position to permit insertion or withdrawal of the cartridge.

The pointed semiconical retaining component 25 permits unimpeded movements of the cartridge between the position of FIG. 1 and a second position in which the front side *5d* of the cartridge is pivoted away from the deck 1, i.e. the illustrated shape of the retaining component 25 reduces the likelihood that the guiding member *8a* or *8b* would strike against the shell *5a* or *5b* when the cartridge 5 is swung about the pivot axles *4a*, *4b*. It will be noted that the flat surface portion *25a* of the retaining component 25 is slightly inclined with respect to and constitutes a smooth continuation of the flat surface portion *24a* of the guiding component 24. The flat surface portion *25a* is inclined in a direction away from the inner side of the tape portion *6b* when the respective guiding member is in the inoperative position so as to further reduce the likelihood that the tape would engage with the retaining component 25 during pivotal movements of the cartridge. In other words, the tape receiving spaces 26 widen in a direction away from the tape deck 1 and along the flat surface portions *25a* of retaining components 25.

FIG. 4 shows a tape head whose tape-contacting face 31 is formed with an inclined portion 32 to permit smooth and unimpeded movement of tape portion *6b* into the position of FIG. 1. The face portion 32 is more distant from the tape deck 1 and is inclined in a direction away from the cartridge 5 so that the tape portion *6b* passing over the capstan spindles *13a*, *13b* may be readily guided between the tape heads *7a–7c* and the guiding members *8a*, *8b*, it being again assumed that the guiding members are then in a position in which their flat surface portions *24a*, *25a* are turned toward the inner side of the tape portion *6b*. It will be readily understood that the surface portions *24a*, *25a* need not be exactly flat but that they may be facetted, slightly convex or configurated in another way as long as the mounting of flattened guiding portions 24–25 with respect to the supporting portions 20 is such that the guiding portions move away from the tape when the guiding members *8a*, *8b* are turned through an angle which approximates 180 degrees.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this ininvention and, therefore, such adaptations should and are intended to be comprehended within the meaning and range of equivalence of the following claims.

What is claimed as new and desired to be secured by Letters Patent is:

1. In a tape recorder, in combination, a tape deck; a tape-containing cartridge adapted to be removably mounted on said deck and formed with aperture means; tape guiding means turnably mounted on said deck and extending through said aperture means when the cartridge is mounted on said deck, said guiding means comprising an eccentric tape guiding portion formed with recess means of a width only slightly exceeding the width of the tape, said guiding means turnable between a first angular position in which the tape is received in said recess means and a second angular position in which said portion is spaced from the tape whereby the tape is guided by said portion against lateral movements in its own plane when the guiding means is in said first angular position and the cartridge may be removed from the deck when the guiding means is turned to said second angular position; and means for turning the guiding means between said first and second angular positions.

2. In a tape recorder, in combination, a tape deck; a tape-containing cartridge adapted to be removably mounted on said tape deck and formed with aperture means; tape guiding means turnably mounted on said deck and extending through said aperture means when the cartridge is mounted on said deck, said guiding means comprising an eccentric tape guiding portion formed with recess means of a width only slightly exceeding the width of the tape, said guiding means turnable between a first angular position in which the tape is received in said recess means and a second angular position in which said portion is spaced from the tape whereby the tape is guided by said portion against lateral movement in its own plane when the guiding means is in said first angular position and the cartridge may be removed from the deck when the guiding means is turned to said second angular position; and means comprising a pinion fixed to said guiding means, a rack meshing with said pinion, and a control element connected with said rack for turning the guiding means between said first and second angular positions.

3. In a tape recorder, in combination, a tape deck; a tape-containing cartridge adapted to be removably mounted on said tape deck and formed with aperture means; tape guiding means turnably mounted on said deck and extending through said aperture means when the cartridge is mounted on said deck, said guiding means comprising an eccentric tape guiding portion formed with recess means of a width only slightly exceeding the width of the tape, said guiding means turnable between a first angular position in which the tape is received in said recess means and a second angular position in which said portion is spaced from the tape whereby the tape is guided by said portion against lateral movements in its own plane when the guiding means is in said first angular position and the cartridge may be removed from the deck when the guiding means is turned to said second angular position; means comprising a pinion fixed to said guiding means, a rack meshing with said pinion, and a control element connected with said rack for turning the guiding means between said first and second angular positions; and resilient means connected with said turning means for constantly biasing the guiding means into said first angular position.

4. In a tape recorder, in combination, a tape deck; a frame swingably mounted on said tape deck; a tape-containing cartridge receivable in said frame, said cartridge having a front side and formed with a plurality of apertures adjacent to said front side; a plurality of tape guiding members, one for each of said apertures, each guiding member turnably mounted on said tape deck and extending through the respective aperture when the cartridge is pivoted by said frame into substantial parallelism with said tape deck, each guiding member comprising an eccentrically mounted flattened tape guiding portion formed with recess means of a width only slightly exceeding the width of the tape, each of said members turnable through substantially 180 degrees between a first angular position in which the tape is received in the respective recess means and a second angular position in which the respective guiding portion is spaced from the tape whereby the tape is guided against lateral movements in its own plane when the tape guiding members are turned to said first position and the cartridge may be removed from said frame when the tape guiding members are turned to said second position; and means mounted on said tape deck for turning the guiding members between said first and second positions.

5. In a tape recorder in combination, a tape deck; a frame swingably mounted on said tape deck; a tape-containing cartridge receivable in said frame, said cartridge having a front side and formed with a plurality of apertures adjacent to said front side; a plurality of tape guiding members, one for each of said apertures, each guiding member comprising a supporting portion turnably mounted on said tape deck and a tape guiding portion extending through the respective aperture when the cartridge is pivoted by said frame into substantial parallelism with said tape deck, each tape guiding portion eccentrically mounted on the respective supporting portion and comprising a tape guiding component having an arcuate surface portion and a substantially flat surface portion, the tape guiding portion of each guiding member further comprising a substantially semiconical retaining component mounted on the respective tape guiding component, each retaining component having a substantially flat surface portion constituting a continuation of the flat surface portion of the respective tape guiding component, the retaining component, the tape guiding component and the supporting portion of each tape guiding member defining between themselves a recess extending along the respective arcuate surface portion and of a width only slightly exceeding the width of the tape, each tape guiding member turnable through substantially 180 degrees between a first angular position in which the tape is received in said recesses and a second angular position in which said flat surface portions are adjacent to but spaced from the tape whereby the tape is guided against lateral movements in its own plane when the tape guiding members are turned to said first position and the cartridge is removable from said frame when the tape guiding members are turned to said second position; and means mounted on said tape deck for turning the guiding members between said first and second angular positions.

6. In a tape recorder, in combination, a tape deck; a frame swingably mounted on said tape deck; a tape-containing cartridge receivable in said frame, said cartridge having a front side and formed with a plurality of apertures adjacent to said front side; a plurality of tape guiding members, one for each of said apertures, each guiding member comprising a cylindrical supporting portion turnably mounted on said tape deck and a tape guiding portion extending through the respective aperture when the cartridge is pivoted by said frame into substantial parallelism with said tape deck, each tape guiding portion eccentrically mounted on the respective supporting portion and comprising a tape guiding component having an arcuate surface portion and a substantially flat surface portion, the tape guiding portion of each guiding member further comprising a substantially semiconical retaining component mounted on the respective tape guiding component, each retaining component having a substantially flat surface portion constituting a continuation of and inclined with respect to the flat surface portion of the respective tape guiding component; the retaining component, the tape guiding component and the supporting portion of each tape guiding member defining between themselves a recess extending along the respective arcuate surface portion and of a width only slightly exceeding the width of the tape, each tape guiding member turnable through substantially 180 degrees between a first angular position in which the tape is received in said recesses and a second angular position in which the flat surface portions of said tape guiding portions are adjacent to but spaced from the tape and the flat surface portions of said retaining components are inclined in a direction away from the tape whereby the tape is guided against lateral movements in its own plane when the tape guiding members are turned to said first angular positions and the cartridge is removable from the frame when the tape guiding members are turned to said second angular positions; and means connected with said supporting portions for turning the guiding members.

7. In a tape recorder, in combination, a tape deck; a frame swingably mounted on said tape deck; a tape-containing cartridge receivable in said frame, said cartridge having a front side and formed with a plurality of apertures adjacent to said front side; a plurality of tape guiding members, one for each of said apertures, each guiding member comprising a cylindrical supporting portion including a shaft turnably mounted in said tape deck and a tape guiding portion extending through the respective aperture when the cartridge is pivoted by said frame into substantial parallelism with said tape deck, each tape guiding portion eccentrically mounted on the respective supporting portion and comprising a tape guiding component having an arcuate surface portion and a substantially flat surface portion, the tape guiding portion of each guiding member further comprising a substantially semiconical retaining component mounted on the respective tape guiding component, each retaining component having a substantially flat surface portion constituting a continuation of and inclined with respect to the flat surface portion of the respective tape guiding component; and the retaining component, the tape guiding component and the supporting portion of each tape guiding member defining between themselves a recess extending along the respective arcuate surface portion and of a width only slightly exceeding the width of the tape, each tape guiding member turnable through substantially 180 degrees between a first angular position in which the tape is received in said recesses and a second angular position in which said flat surface portions are adjacent to but spaced from the tape whereby the tape is guided against lateral movements in its own plane when the tape guiding members are turned to said first position and the cartridge is removable from said frame when the tape guiding members are turned to said second position; and means comprising pinions connected with the shafts of said supporting portions and toothed racks meshing with said pinions for turning the guiding members between said first and second angular positions.

8. In a tape recorder, in combination, a tape deck; a cartridge having a front side formed with a plurality of apertures and comprising reel means for mounting a finite length of tape in such manner that a portion of the tape extends along said front side, said apertures formed at one side of said tape portion and said cartridge adapted to be removably mounted on said tape deck; a plurality of tape heads mounted on said tape deck and each having a tape-contacting face adjacent to the other side of said tape portion when the cartridge is mounted on said deck, each of said faces having a portion inclined with respect to and in a direction away from the other side of said tape portion; a plurality of tape guiding members, one for each of said apertures, each guiding member turnably mounted on said tape deck and extending through the respective aperture when the cartridge is mounted on said deck, and each guiding member comprising an eccentric tape guiding portion adjacent to said one side of the tape portion and defining a recess of a width only slightly exceeding the width of the tape, each guiding member turnable through substantially 180 degrees between a first angular position in which the tape is received in the respective recess and a second angular position in which the respective tape guiding portion is spaced from said one side of the tape whereby the tape is guided against lateral movements in its own plane when the guiding members are turned to said first position and the cartridge is removable from the deck when the guiding members are turned to said second position; and means for turning the guiding members between said first and second angular positions.

9. In a tape recorder, in combination, a tape deck; a cartridge having a front side formed with two spaced apertures and comprising reel means for mounting a finite length of tape in such manner that a portion of the tape extends along said front side, said apertures formed at one side of said tape portion and said cartridge removably mounted on said deck for pivotal movements between a position of substantial parallelism and a position of inclination with respect to said tape deck; three tape heads mounted on said tape deck and each having a tape-contacting face adjacent to the other side of said tape portion when the cartridge is in substantial parallelism with said deck, each of said faces having a portion spaced from said deck and inclined with respect to and in a direction away from the other side of said tape portion; two tape guiding members turnably mounted on said deck and each extending through one of said apertures when the cartridge is in substantial parallelism with the tape deck, said guiding members alternating with said tape heads and each comprising an eccentric tape guiding portion and defining a recess of a width only slightly exceeding the width of the tape, each guiding member turnable through substantially 180 degrees between a first angular position in which the tape is received in the respective recess and a second angular position in which the respective tape guiding portion is spaced from said one side of the tape whereby the tape is guided against lateral movements in its own plane when the guiding members are turned to said first position and the cartridge is removable from the deck when the guiding members are turned to said adjacent to said one side of the tape portion second position; and means for turning the guiding members between said first and second angular positions.

10. As a novel article of manufacture for use in a tape recorder of the type in which a tape-containing cartridge is removably mounted on the tape deck, a turnable tape guiding member comprising an eccentric tape guiding portion formed with a recess of a width only slightly exceeding the width of the tape, said member turnable between a first angular position in which the tape is received in said recess and is thereby guided against lateral movements in its own plane, and a second angular position in which its guiding portion is spaced from the tape to permit removal of the cartridge from the deck.

11. As a novel article of manufacture for use in a tape recorder of the type in which a tape containing cartridge is pivotally mounted on the tape deck, a turnable tape guiding member comprising an eccentric tape guiding portion, including a substantially semicylindrical component having a tape-engaging arcuate surface portion and a substantially flat surface portion, and a substantially semiconical retaining component rigid with said tape guiding component, said retaining component having a flat surface portion constituting a continuation of said first mentioned flat surface portions, said components defining between themselves a recess extending along said arcuate surface portion and of a width only slightly exceeding the width of the tape, said member turnable between a first angular position in which the tape is received in said recess and a second angular position in which the tape is adjacent to but spaced from said flat surface portions whereby the tape is guided against lateral movements in its own plane when the guiding member is turned to said first angular position and the cartridge is pivotable with respect to the deck when the guiding member is turned to said second angular position.

12. As a novel article of manufacture for use in a tape recorder of the type in which a tape-containing cartridge is pivotally mounted on the tape deck, a turnable tape guiding member comprising a supporting portion and a tape guiding portion rigid with and eccentric with respect to said supporting portion, said tape guiding portion comprising a substantially semicylindrical component having a tape-engaging arcuate surface portion and a substantially flat surface portion, and a substantially semiconical retaining component rigid with said tape guiding component and having a flat surface portion constituting a continuation of and at least slightly inclined with respect to said first mentioned flat surface portion, said retaining component and said supporting portion defining between themselves a recess having a width only slightly exceeding the width of the tape and extending along said arcuate surface portion, said tape guiding member turnable to a first angular position in which the tape is received in said recess and through substantially 180 degrees to a second angular position in which said surface portions are adjacent to but spaced from the tape, the tape being guided by said retaining component, by said supporting portion and by said arcuate surface portion when the guiding member is turned to said first position and the cartridge being free to pivot with respect to the deck when the guiding member is turned to said second position.

References Cited in the file of this patent

UNITED STATES PATENTS

| | | |
|---|---|---|
| 1,320,818 | Youngblood | Nov. 4, 1919 |
| 2,587,097 | Berlant | Feb. 26, 1952 |
| 2,852,254 | Reiskind | Sept. 16, 1958 |
| 2,864,611 | Gray | Dec. 16, 1958 |
| 2,928,906 | Gernert | Mar. 15, 1960 |